(12) United States Patent
Kwak et al.

(10) Patent No.: US 9,363,724 B2
(45) Date of Patent: Jun. 7, 2016

(54) TELEVISION BAND (TVBD) CHANNEL QUIETING ACROSS DIVERSE RADIO ACCESS TECHNOLOGIES

(71) Applicant: InterDigital Patent Holdings, Inc., Wilmington, DE (US)

(72) Inventors: Joseph A. Kwak, Bolingbrook, IL (US); Alexander Reznik, Titusville, NJ (US); Juan Carlos Zuniga, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 14/256,211

(22) Filed: Apr. 18, 2014

(65) Prior Publication Data

US 2014/0228067 A1   Aug. 14, 2014

Related U.S. Application Data

(63) Continuation of application No. 13/846,212, filed on Mar. 18, 2013, now abandoned, which is a continuation of application No. 12/754,841, filed on Apr. 6, 2010, now Pat. No. 8,401,478.

(60) Provisional application No. 61/167,050, filed on Apr. 6, 2009, provisional application No. 61/296,359, filed on Jan. 19, 2010.

(51) Int. Cl.
*H04W 16/14* (2009.01)
*H04W 36/06* (2009.01)
(Continued)

(52) U.S. Cl.
CPC .............. *H04W 36/06* (2013.01); *H04W 16/14* (2013.01); *H04W 72/1215* (2013.01); *H04W 84/042* (2013.01)

(58) Field of Classification Search
CPC ..................................... H04W 16/14
USPC .............. 455/62, 450, 452.2, 514, 553.1; 370/329, 331; 348/731, E5.097
See application file for complete search history.

(56) References Cited

U.S. PATENT DOCUMENTS 7,231,215 B2   6/2007 Lewis et al.
7,917,110 B2 *  3/2011 Horiguchi et al. ......... 455/164.1
(Continued)

FOREIGN PATENT DOCUMENTS

CN   101305635 A   11/2008
JP   2007-166488 A   6/2007
(Continued)

OTHER PUBLICATIONS

Baykas et al. (INICT, Nokia, Qualcomm), IEEE P802.19 Wireless Coexistence, System Design Document, IEEE 802.19-10/0055r3, (Mar. 18, 2010).

(Continued)

*Primary Examiner* — Tuan H Nguyen
(74) *Attorney, Agent, or Firm* — Condo Roccia Koptiw LLP

(57) ABSTRACT

A method and apparatus for use in a spectrum manager are disclosed herein. A method includes receiving device parameters from a wireless transmit/receive unit (WTRU) in a managed area, transmitting the device parameters to a central television band (TVBD) data base server, wherein the spectrum manager also stores the device parameters in a local database, receiving enabling information from the central TVBD data base server, and transmitting the enabling information to the WTRU in the managed area.

18 Claims, 7 Drawing Sheets

(51) Int. Cl.
*H04W 72/12* (2009.01)
*H04W 84/04* (2009.01)

(56) References Cited

U.S. PATENT DOCUMENTS

| | | | |
|---|---|---|---|
| 8,094,615 | B2 | 1/2012 | Tandai et al. |
| 8,284,755 | B2 | 10/2012 | Challapali et al. |
| 8,588,115 | B2 | 11/2013 | Gao et al. |
| 2005/0083879 | A1* | 4/2005 | Peek ............................ 370/329 |
| 2008/0090581 | A1 | 4/2008 | Hu |
| 2008/0219201 | A1 | 9/2008 | Challapali et al. |
| 2008/0259859 | A1 | 10/2008 | Cordeiro et al. |
| 2009/0016293 | A1 | 1/2009 | Kang et al. |
| 2011/0158147 | A1* | 6/2011 | Li et al. ........................ 370/312 |

FOREIGN PATENT DOCUMENTS

| | | |
|---|---|---|
| JP | 2007-300419 A | 11/2007 |
| JP | 2008-078807 A | 4/2008 |
| JP | 2009-509382 A | 3/2009 |
| TW | 2007-35610 A | 9/2007 |
| WO | 2007/100323 | 9/2007 |
| WO | 2009/069069 | 6/2009 |

OTHER PUBLICATIONS

Goldhammer, Mariana (Alvarion), "Detailed Scope of IEEE 802.16h Standard", IEEE 802.16h-05/003, IEEE 802.16 Session #35, Tel Aviv, Israel, (Jan. 24-27, 2005).

IEEE Computer Society and the IEEE Microwave Theory and Techniques Society, "IEEE Standard for Local and Metropolitan Area Networks Part 16: Air Interface for Fixed Broadband Wireless Access Systems", IEEE Std 802.16—2009, (Revision of IEEE Std 802.16-2004) (May 29, 2009).

IEEE Computer Society and the IEEE Microwave Theory and Techniques Society, IEEE Standard for Local and Metropolitan Area Networks Part 16: Air Interface for Fixed Broadband Wireless Access Systems, Amendment 3: Management Plane Procedures and Services, IEEE Std 802.16g—2007, (Amendment to IEEE Std 802.16-2004) (Dec. 31, 2007).

IEEE Computer Society, "Draft Amendment to Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications Amendment 7: Interworking With External Networks", IEEE Std 802.11u/D4.01—2008 (Oct. 2008).

IEEE Computer Society, "Information Technology—Telecommunications and Information Exchange Between Systems—Local and Metropolitan Area Networks—Specific Requirements—Part 11: Wireless LAN Medium Access Control (MAC) and Physical Layer (PHY) Specifications", IEEE Std 802.11—2007 (Revision of IEEE Std 802.11—1999), (Jun. 12, 2007).

IEEE Computer Society/ Local and Metropolitan Area Networks, "Information Technology-Telecommunications and Information Exchange Between Systems—Wireless Regional Area Networks (WRAN)—Specific Requirements—Part 22.2: Recommended Practice for the Installation and Deployment of IEEE 802.22 Systems", IEEE P802.22 WRAN Working Group, Project No. P802.22.2, Par for New IEEE Standard, (Sep. 2006).

IEEE Computer Society/ Local and Metropolitan Area Networks, "Standard for Information Technology-Telecommunications and Information Exchange Between Systems—Wireless Regional Area Networks (WRAN)—Specific Requirements—Part 22: Cognitive Wireless RAN Medium Access Control (MAC) and Physical Layer (PHY) Specifications: Policies and Procedures for Operation in the TV Bands", IEEE P802.22 WRAN Working Group, Modification to a previously approved PAR, (Dec. 2009).

IEEE Computer Society/ Local and Metropolitan Area Networks, "Standard to Enhance Harmful Interference Protection for Low Power Licensed Devices Operating in TV Broadcast Bands", IEEE P802.22.1 WRAN Working Group, (Mar. 2006).

IEEE P802.15 Working Group for Wireless Personal Area Networks (WPANs), "Channel Model for Body Area Network (BAN)", IEEE P802.15 Wireless Personal Area Networks, (IEEE 802.15-08-0780-05-0006), (Feb. 2009).

IEEE P802.15 Working Group for Wireless Personal Area Networks (WPANs), "Draft Text for Multi-PHY-Mode (MPM) Management Scheme Through Common Signalling Mode (CSM) for 802.15.4g WPAN", IEEE P802.15 Wireless Personal Area Networks, (IEEE 802.15-10-0090-00-004g), (Feb. 2010).

Kasslin et al. (Nokia), Coexistence Architecture of 802.19.1, IEEE 802.19-10/0013r0, (Jan. 19, 2010).

Kwak et al. (InterDigital), TVWS Architecture Options, IEEE 802.19-10/xxxxr0, (Jan. 21, 2010).

LAN MAN Standards Committee of the IEEE Computer Society, "Standard for Local and Metropolitan Area Networks: Media Independent Handover Services", IEEE P802.21 (2008) (Jan. 21, 2009).

Puthenkulam, Jose, and Iyer, Prakash (Intel Corporation), "IEEE 802.16g Scope and Architectural Considerations", IEEE 802.16g-04/07, (Presentation Submission Template Revision 8.3) IEEE 802.16 Interim Session #33, Seoul, (Aug.-Sep. 2004).

Seol, Jae-Han and Chung, Jong-Moon, "IEEE 802.21 MIH Based Handover for Next Generation Mobile Communication Systems" Communication and Networking Laboratory (CNL) School of Electrical & Electronic Engineering, Yonsei University, Seoul, Korea (2008).

Shellhammer, Steve (Qualcomm), TV White Space Coexistence Plan, IEEE 802.19-09/0010r0, (Mar. 22, 2009).

Wierenga, Klaas, (Cisco) "TF-Mobility", IEEE 802.11u-Overview, (Loughborough, May 7, 2009).

Gao et al., "Pipelined Cooperative Spectrum Sensing in Cognitive Radio Networks", IEEE Wireless Communications and Networking Conference, Apr. 5-8, 2009, 6 pages.

Matthew Sherman, "TV Whitespace Tutorial Intro", IEEE 802 Executive Committee Study Group on TV White Spaces, sgwhitespace-09-0055-00-0000, Mar. 10, 2009, 197 pages.

* cited by examiner

TELEVISION BAND (TVBD) CHANNEL QUIETING ACROSS DIVERSE RADIO ACCESS TECHNOLOGIES

CROSS REFERENCES TO RELATED APPLICATIONS

This application is a continuation of U.S. Non-Provisional application Ser. No. 13/846,212 filed Mar. 18, 2013, which is a continuation of U.S. Non-Provisional application Ser. No. 12/754,841 filed Apr. 6, 2010, which issued as U.S. Pat. No. 8,401,478 on Mar. 19, 2013, and claims the benefit of U.S. Provisional Application No. 61/167,050, filed on Apr. 6, 2009, and U.S. Provisional Application No. 61/296,359, filed on Jan. 19, 2010, all of which are hereby incorporated by reference herein in their entirety.

TECHNICAL FIELD

This disclosure relates to wireless communications.

BACKGROUND

The United States Federal Communications Commission (FCC) has decided to open portions of Very High Frequency (VHF) and Ultra High Frequency (UHF) spectrum for use by unlicensed devices. Use of the newly available spectrum may be subject to regulatory requirements intended to protect licensed devices of the spectrum from interference. For example, unlicensed devices may be required to sense for licensed devices on the channel on which they are operating. Further, unlicensed devices may be required to stop transmitting on a particular channel (referred to as "channel quieting"), so that sensing for licensed devices on the channel within a particular geographic area can be performed. Current technologies do not address how channel quieting may be performed when unlicensed devices that use diverse radio access technologies (RATs) are operating in the same frequency bands. Therefore, new technologies are required that address these and other shortcomings of the current technologies.

SUMMARY

A method and apparatus for use in a spectrum manager are disclosed herein. A method includes receiving device parameters from a wireless transmit/receive unit (WTRU) in a managed area, transmitting the device parameters to a central television band (TVBD) data base server, wherein the spectrum manager also stores the device parameters in a local database, receiving enabling information from the central TVBD data base server, and transmitting the enabling information to the WTRU in the managed area.

BRIEF DESCRIPTION OF THE DRAWINGS

A more detailed understanding may be had from the following description, given by way of example in conjunction with the accompanying drawings wherein.

DETAILED DESCRIPTION

Figure 1:
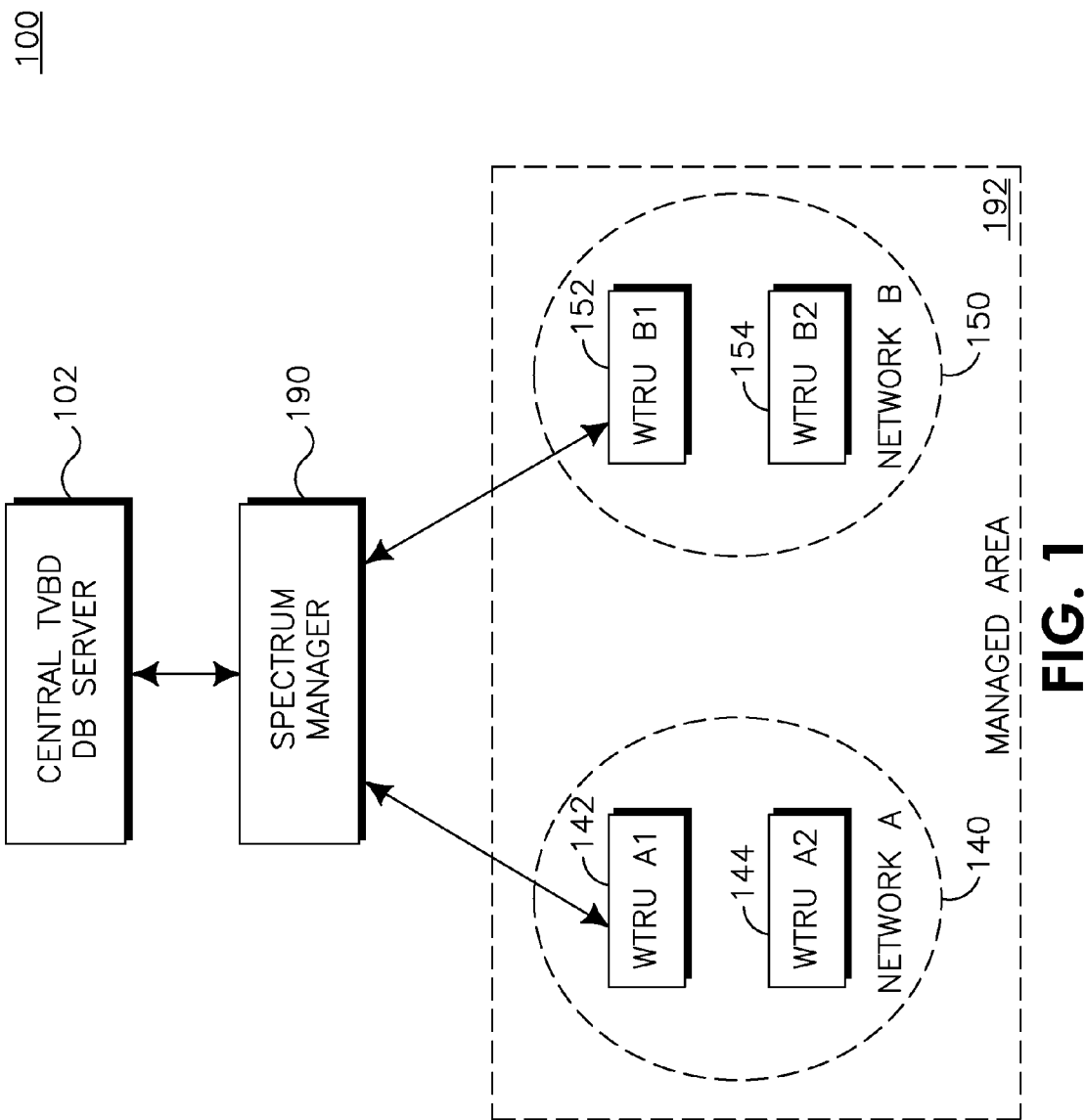
FIG. 1 shows an example architecture for the communication of wireless data on television band (TVBD) frequencies.

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, a site controller, an access point (AP), a Radio Network Access Point (RNAP), or any other type of interfacing device capable of operating in a wireless environment. As used herein, "television band (TVBD) frequencies" refers to frequencies that are within VHF and/or UHF frequency ranges. VHF ranges from 30-300 megahertz (MHz). UHF ranges from 300-3000 MHz. When referred to hereafter, the terminology "TVBD WTRU" refers to a WTRU capable of communicating wireless data on TVBD frequencies. A TVBD WTRU may also be capable of communicating on non-TVBD frequencies. When referred to hereafter, the terminology "TVBD base station" includes a base station capable of communicating wireless data on TVBD frequencies. A TVBD base station may also be capable of communicating on non-TVBD frequencies.

In some circumstances, TVBD WTRUs may be required to operate according to a regulatory scheme propagated by the U.S. FCC. According to this regulatory scheme, licensed TVBD WTRUs may be permitted to operate on TVBD channels for which they are licensed. Unlicensed TVBD WTRUs may be permitted to operate on channels that are not occupied by licensed TVBD WTRUs in their geographic vicinity, so as not to cause interference for licensed TVBD WTRUs. The channels that are not occupied by licensed WTRUs and on which unlicensed WTRUs are permitted to operate are referred to as "white spaces" or "white space channels."

The FCC may maintain a central TVBD database that indicates which channels in which geographic areas have been allocated to licensed WTRUs. Unlicensed WTRUs may be required to query the TVBD database periodically or in response to a triggering event. To query the database, an unlicensed WTRU may send information to the database that indicates the location of the WTRU. The database will determine, based on the location of the WTRU, which channels (if any) it is permitted to operate on at its current location. The TVBD database may be replicated and the information in the database may be provided by non-governmental database providers. The provider databases may include the entire data in the full TVBD database, or may include a subset that is applicable only to a specific geographical area. Unlicensed WTRUs may be configured to communicate with the database of a database provider instead of the central database itself; however, unlicensed WTRUs and the provider database may implement the same query/response mechanism described above with respect to the central database. The central TVBD database and the TVBD databases of database providers may communicate periodically and/or in response to triggering events, so as to ensure the consistency of data across their respective databases.

Unlicensed WTRUs may be required to perform sensing measurements to detect licensed WTRUs. In some circumstances, it may be difficult to detect licensed WTRUs while unlicensed WTRUs are transmitting. Unlicensed WTRUs may thus be required to participate in channel quieting. With channel quieting, an unlicensed WTRU ceases transmitting on a channel for a period of time. During this time, the WTRU may perform sensing on the channel to determine if any licensed WTRUs are present on the channel. Channel quieting may be coordinated across the unlicensed WTRUs that are operating on a channel, such that all of the unlicensed WTRUs cease transmitting and perform sensing at the same time.

An unlicensed TVBD WTRU may be classified into four types: Fixed; Mode I; Mode II; or Sensing-Only (SO). Table 1 shows different characteristics of the four types.

TABLE 1

| Device Type | Mobility | Maximum permitted transmit power (EIRP) | Geolocation information/ TVBD database access | Enabling capability | Allowed on channel adjacent to licensed devices |
|---|---|---|---|---|---|
| Fixed | Fixed only | <4 watts | Required | Master | No |
| Mode II | Fixed or mobile | <100 mW | Required | Master | Yes, but max transmit power <40 mW |
| Mode I | Fixed or mobile | <100 mW | via Fixed or Mode II device | Slave | Yes, but max transmit power <40 mW |
| Sensing-Only | Fixed or mobile | <50 mW | not required | N/A | Yes, but max transmit power <40 mW |

Fixed WTRUs are stationary and operate at a specific fixed location. A Fixed WTRU is not permitted to operate at a maximum of one watt with antenna gain, to achieve 4 watts Equivalent Isotropic Radiated power (EIRP). A Fixed WTRU is not permitted to operate on a channel that is adjacent to a channel on which a licensed WTRU is operating. A Fixed WTRU may be required to obtain and/or store information related to its geolocation. A Fixed WTRU may obtain geolocation information via any combination or sub-combination of Global Position System (GPS) technology, base station triangulation, and/or other mechanisms. A Fixed WTRU may be required to access a TVBD database prior to its initial service transmission at a given location. A Fixed WTRU may also be required to access a TVBD database once per day, to verify the continuing availability of channels. A Fixed WTRU may also periodically quiet on a channel and perform sensing measurements to verify the continued availability of channels. A Fixed WTRU may be capable of operating as a "master" device. A master device may receive a list of available channels provided by the FCC database and may send information to other WTRUs (referred to as "enabling signals" or "enabling information") that indicate which channels the other WTRUs may operate on. A master WTRU does not depend on any other WTRU for this enabling information.

Mode II WTRUs may be fixed or portable, and may transmit using a maximum transmit power of 100 milliwatts EIRP with no antenna gain. A Mode II WTRU may be able to roam between cells or other sub-divisions within a radio access network. A Mode II WTRU may be required to obtain and/or store information related to its geolocation. A Mode II WTRU may obtain geolocation information via any combination or sub-combination of Global Position System (GPS) technology, base station triangulation, and/or other mechanisms. A Mode II WTRU may be required to access a TVBD database prior to its initial service transmission at a given location, each time it is activated from a power-off state, if it changes location during operation, and/or once per day if it has been in a powered state. A Mode II WTRU may also periodically quiet on a channel and perform sensing measurements to verify the continued availability of channels. Mode II WTRUs may act as master devices.

Mode I WTRUs may be fixed or portable, and may transmit using a maximum transmit power of 100 milliwatts EIRP. A Mode I WTRU may be able to roam between cells or other sub-divisions within a radio access network. A Mode I WTRU is not required to access a TVBD database, but may operate as a "slave" device, meaning that it obtains enabling information from a master device. A Mode I device may also obtain geolocation information for a Mode II or Fixed WTRU with which it is in communication.

Fixed TVBD WTRUs are not permitted to communicate on channels adjacent to channels that are used by licensed TVBD WTRUs. Mode I, Mode II, and SO TVBD WTRUs are permitted to operate on channels that are adjacent to channels that are used by licensed TVBD WTRUs, but they are not permitted to transmit at greater than 40 milliwatts when doing so. TVBD WTRUs of all types must be able to sense licensed TVBD WTRUs.

SO WTRUs may send and receive data on TVBD frequencies, but may transmit on TVBD frequencies at a maximum transmit power of 50 milliwatts EIRP. SO WTRUS are not required to have a connection to a TVBD database.

A TVBD WTRU may be capable of switching between operation as a Fixed WTRU, Mode I WTRU, Mode II WTRU, SO WTRU, or any combination thereof. A WTRU that is operating as a Mode I WTRU or Mode II WTRU may switch to operating as a SO WTRU when, for example, it is unable to establish a connection that provides access to a TVBD database and/or to a master WTRU.

A Fixed or Mode II WTRU that is a base station or non-base station WTRU may act as a master WTRU for one or more other WTRUs. Non-master WTRUs may be base stations and/or non-base station WTRUs.

FIG. 1 shows an example architecture 100 for the communication of wireless data on TVBD frequencies. The example architecture 100 includes a central TVBD database server 102. The central TVBD database server 102 manages a central database that may include location information for licensed and unlicensed TVBD WTRUs. The central database may be, for example, a central FCC TVBD database.

The example architecture 100 includes a Spectrum Manager 190, which manages channel quieting and sensing in its managed area 192. The Spectrum Manager 190 may access the central TVBD database server 102, and may query the central database and update records of interest.

The Spectrum Manager 190 may manage its own local database. The local database may include one or more records for each unlicensed WTRU operating in its managed area 192. Each record may include some or all of the following information for each WTRU: a client ID; an enabling WTRU ID; information related to geolocation; information indicating the accuracy of the location information; center frequency; maximum bandwidth used; maximum transmission power; access initiation time; access termination time (if scheduled); Media Access Control (MAC) address; MAC address of radio network access point; and radio capability information. Radio capability information may include some or all of the following information: supported RATs; supported frequencies; supported data rates; supported services; a description of mobility (for example, whether fixed, moving, moving at the speed of a pedestrian or a slow vehicle); power capability (for example, whether unlimited, limited, possessing more than a one hour reserve of power, or possessing less than a one hour reserve of power); sensing and measuring capabilities; and antenna capabilities.

The database managed by the Spectrum Manager 190 may additionally include one or more records for each TVBD channel managed by the Spectrum Manager. Each channel record may include some or all of the following information: whether the channel is blocked by a licensed user or available for use; whether the channel is occupied or unoccupied; a list of RATs being presently used on the channel; total channel load and/or time utilization information on the channel across all RATs; and channel load information per RAT.

The example architecture 100 further includes two radio access networks in the managed area 192, which are Network A 140 and Network B 150. Network A 140 and/or Network B 150 may be based on a technology such as Institute of Electrical and Electronics Engineers (IEEE) 802.11x, IEEE 802.19.x, Long Term Evolution (LTE), LTE-Advanced (LTE-A), IEEE 802.16x, IEEE 802.22x, or any other wireless technology. Network A 140 and Network B 150 may be based on different RATs.

Network A 140 may include any combination of Fixed, Mode I, Mode II, and/or SO TVBD WTRUs, such as WTRU A1 142 and WTRU A2 144. WTRU A1 142 and WTRU A2 144 may communicate using the RAT upon which Network A 140 is based. WTRU A2 144 may be, for example, a Mode I WTRU. WTRU A1 142 may be a base station or other type of WTRU, and may be a Fixed WTRU or a Mode II WTRU. WTRU A1 142 may operate as a master WTRU and may receive information from the central TVBD database server 102 via the Spectrum Manager 190. The received information may be enabling information, or may be information upon which enabling information may be based. WTRU A1 142 may provide enabling information to WTRU A2 144 and/or other non-master WTRUs (not depicted) in Network A 140 based on the received information. Network A 140 may also include other master WTRUs (not depicted).

Network B 150 may include any combination of Fixed, Mode I, Mode II, and/or SO TVBD WTRUs, such as WTRU B1 152 and WTRU B2 154. WTRU B1 152 and WTRU B2 154 may communicate using the RAT upon which Network B 150 is based. WTRU B2 154 may be, for example, a Mode I WTRU. WTRU B1 152 may be a base station or other type of WTRU, and may be a Fixed WTRU or a Mode II WTRU. WTRU B1 152 may operate as a master WTRU and may receive information from the central TVBD database server 102 via the Spectrum Manager 190. The received information may be enabling information, or may be information upon which enabling information may be based. WTRU B1 152 may provide enabling information to WTRU B2 154 and/or other non-master WTRUs (not depicted) in Network B 150 based on the received information. Network B 150 may also include other master WTRUs (not depicted).

The Spectrum Manager 190 may receive event-driven network status information from the WTRUs in Network A 140 and/or Network B 150. For example, a WTRU such as WTRU A1 142, WTRU A2 144, WTRU B1 152, or WTRU B2 154 may send a notification to the Spectrum Manager 190 when it changes location, changes a channel, or detects a licensed WTRU on a channel. The Spectrum Manager 190 may push data received from the WTRUs in its managed area 192 to the central TVBD database server 102 and/or store the received data in its local database.

The Spectrum Manager 190 may implement the coordination of quieting functions in its managed area 192. The Spectrum Manager 190 accomplishes this by scheduling quiet periods and sending command signals to WTRUs in its managed area 192.

The Spectrum Manager 190 may schedule quiet periods based on network status information related to the networks in the managed area 192. Scheduling quiet periods may include determining start times and/or end times for quiet periods. Network status information may include radio characteristics such as which TVBD channels are available, channel loading and/or channel usage on available TVBD channels, and/or channel usage on a per-RAT basis. Alternatively or additionally, scheduling may be based on event-driven network status information received from WTRUs, based on events such as when a WTRU changes location, changes a channel, or detects a licensed WTRU on a channel. The Spectrum Manager 190 may additionally aggregate sensing measurement results received from the WTRUs in the managed area 192 in order to better detect licensed users.

In addition to scheduling quiet periods, the Spectrum Manager 190 may send commands to WTRUs in the managed area in order to implement the quiet periods. For example, the Spectrum Manager 190 may send commands to WTRU A1 142 and WTRU B1 152 related to channel quieting. WTRU A1 and WTRU B1 152 may also relay commands related to channel quieting to other WTRUs in their respective networks 140, 150, such as WTRU A2 144 and WTRU B2 154. These channel quieting commands may request that the WTRUs in the Network A 140 and/or Network B 150 perform services relating to channel quieting such as quieting a channel on command, sensing a channel on command, reporting sensing measurements to the Spectrum Manager 190, and/or performing channel switching on command. The WTRUs in Network A 140 and/or Network B 150 may take actions as indicated in the commands.

The Spectrum Manager 190 may implement quiet periods using a variety of techniques. For example, the Spectrum Manager 190 may coordinate quieting on a channel when only one RAT is used on the channel, may reassign all of the WTRUs in the managed area 192 that are using the same RAT from a current channel to an alternate channel, may aggregate all WTRUs that are using the same RAT from several channels to a single channel, and/or use other techniques. Alternatively or additionally, the Spectrum Manager 190 may coordinate quiet periods using the methods described below with reference to FIGS. 4-6.

Communication between the Spectrum Manager 190 and the central TVBD database server 102 may take place via the Internet, and/or via one or more private networks. Communication between the Spectrum Manager 190 and WTRU A1 142 and WTRU B1 152 may also take place via the Internet, and/or via one or more private networks.

In various implementations, the messages described above as communicated between the Spectrum Manager 190 and the WTRUs in the managed area 192 may be communicated using different interfaces and/or message formats. For example, media independent messages defined according to the IEEE 802.21x Media Independent Coordination (MIC) protocol and/or IEEE 802.19.1 standards may be used. Alternatively or additionally, messages defined according to Internet Engineering Task Force (IETF) Mobility for IP: Performance, Signaling and Handoff Optimization (MIPSHOP) Working Group standards may be used at Layer Three over different Layer One and Layer Two interfaces. Additionally, a number of different message types, interfaces, and protocols may be used, including but not limited to: containers for MIC messages for IEEE 802.21 as defined in IEEE 802.11u; containers and primitives for IEEE 802.21 messages for IEEE 802.16 as defined in IEEE 802.16g/h; containers for MIC messages for 802.22 as defined in IEEE 802.22.1 and/or IEEE 802.22.2; or containers for MIC messages for non-802 WTRUs.

Figure 2:
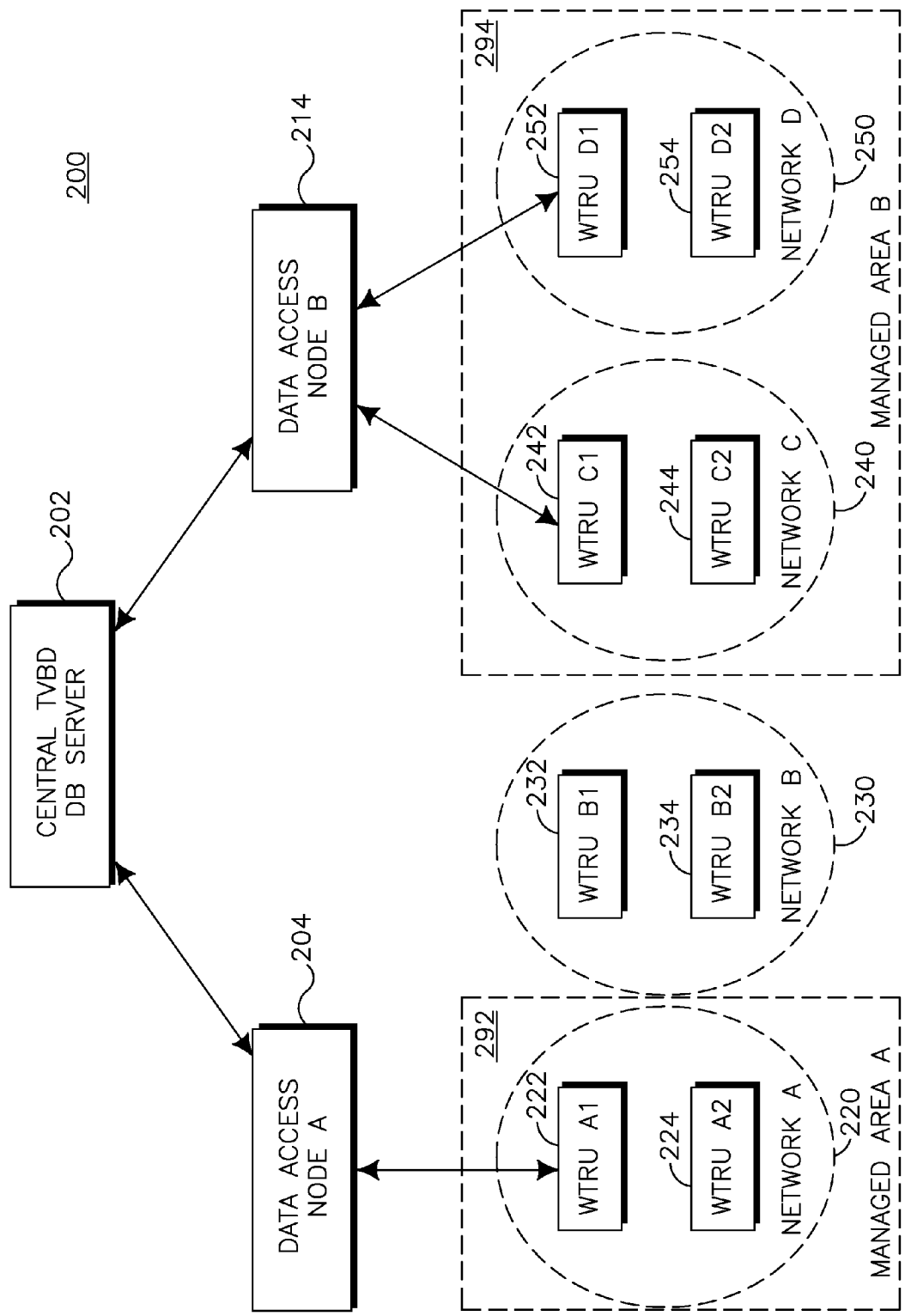
FIG. 2 shows a second example architecture for the communication of wireless data on TVBD frequencies.

FIG. 2 shows a second example architecture 200 for the communication of wireless data on TVBD frequencies. The example architecture 200 may include central database server 202, which may manage a central database of TVBD data. The TVBD data may include information related to licensed TVBD WTRUs and their licensed geographic areas, unlicensed TVBD WTRUs, and/or other information related to operation in TVBD frequencies. The central TVBD database server 202 may be in communication with Database Access Node A 204 and Database Access Node B 214. Database Access Node A 204 and Database Access Node B 214 may store a full replica of the central TVBD database or some subset thereof. Database Access Node A 204 and/or Database Access Node B 214 may, for example, store only a portion of the central database that is applicable to a geographic area that they are serving.

The example architecture 200 of FIG. 2 may include four radio access networks, Network A 220, Network B 230, Network C 240, and Network D 250. Each or any of these networks 220, 230, 240, 250 may be based on a technology such as IEEE 802.11x, IEEE 802.19.x, LTE, LTE-A, IEEE 802.16x, IEEE 802.22x, or any other wireless technology. The networks 220, 230, 240, 250 may operate using any combination of different RATs. Database Access Node A 204 manages Managed Area A 292, which includes Network A 220. Database Access Node B 214 manages Managed Area B 294, which includes Network C 240 and Network D 250.

Network A 220 may include any combination of Fixed, Mode I, Mode II, and/or SO TVBD WTRUs, such as WTRU A1 222 and WTRU A2 224. WTRU A1 222 and WTRU A2 224 may communicate using the RAT upon which Network A 220 is based. WTRU A2 224 may be, for example, a Mode I WTRU. WTRU A1 222 may be a base station or other type of WTRU, and may be a Fixed WTRU or a Mode II WTRU. WTRU A1 222 may operate as a master WTRU and receive information from Database Access Node A 204. The received information may be enabling information, or may be information upon which enabling information may be based. WTRU A1 222 may provide enabling information to WTRU A2 224 and/or other non-master WTRUs (not depicted) in Network A 220 based on the received information. Network A 220 may also include other master WTRUs (not depicted).

WTRU A1 222 may communicate information to Database Access Node A 204 such as registration information and credentials for WTRU A1 222. In response, Database Access Node A 204 may determine whether WTRU A1 222 should be registered, and may send information to WTRU A1 222 indicating whether the registration was accepted or not. Further, WTRU A1 222 may communicate query information to Database Access Node A 204 to determine which TVBD channels it may operate on. The query information may include information related to a geolocation, terminal type, transmit power, and/or other information describing WTRU A1 222. Database Access Node A 204 may respond by sending one or more messages to WTRU A1 222 that indicate a list of TVBD channels that WTRU A1 222 is permitted to operate on. WTRU A1 222 may additionally perform these types of communications with Database Access Node A 204 on behalf of non-master WTRUs in Network A 220, such as WTRU A2 224 or other WTRUs.

Network C 240 may include any combination of Fixed, Mode I, Mode II, and/or SO TVBD WTRUs, such as WTRU C1 242 and WTRU C2 244. WTRU C1 242 and WTRU C2 244 may communicate using the RAT upon which Network C 240 is based. WTRU C2 244 may be, for example, a Mode I WTRU. WTRU C1 242 may be a base station or other type of WTRU, and may be a Fixed WTRU or a Mode II WTRU. WTRU C1 242 may operate as a master WTRU and receive information from Database Access Node A 204. The received information may be enabling information, or may be information upon which enabling information may be based. WTRU C1 242 may provide enabling information to WTRU C2 244 and/or other non-master WTRUs (not depicted) in Network C 240 based on the received information. Network C 240 may also include other master WTRUs (not depicted).

Network D 250 may include any combination of Fixed, Mode I, Mode II, and/or SO TVBD WTRUs, such as WTRU D1 252 and WTRU D2 254. WTRU D1 252 and WTRU D2 254 may communicate using the RAT upon which Network D 250 is based. WTRU D2 254 may be, for example, a Mode I WTRU. WTRU D1 252 may be a base station or other type of WTRU, and may be a Fixed WTRU or a Mode II WTRU. WTRU D1 252 may operate as a master WTRU and receive information from Database Access Node A 204. The received information may be enabling information, or may be information upon which enabling information may be based. WTRU D1 252 may provide enabling information to WTRU D2 254 and/or other non-master WTRUs (not depicted) in Network D 250 based on the received information. Network D 250 may also include other master WTRUs (not depicted).

The example architecture 200 of FIG. 2 further includes Network B 230. Network B may include SO TVBD WTRUs such as WTRU B1 232 and WTRU B2 234. Network B may be, for example, an ad hoc network, and may be based on a technology such as IEEE 802.11, 802.15, Zigbee, Bluetooth, or any other wireless technology. WTRU B1 232 and WTRU B2 234 may communicate using the RAT upon which Network B 230 is based. As shown in FIG. 2, none of the WTRUs in Network B 230 have a connection to a database access node; as the WTRUs in Network B 230 are SO WTRUs, such a connection is not required. The example architecture 200 may additionally include other ad hoc networks (not depicted) made up of SO TVBD WTRUs. The other ad hoc networks may operate using any of the RATs used by Network A 220, Network B 230, Network C 240, Network D 250, and/or any other appropriate RAT.

Database Access Node A 204 and/or Database Access Node B 214 may communicate with the WTRUs in Network B 230. This may be performed by using, for example, indirect signals such as beacon signals, channel jamming signals, microphone radio frequency (RF) aliases, and/r broadcast RF aliases. Database Access Node A 204 and/or Database Access Node B 214 may communicate data with the WTRUs in Network B 230 that is identical to and/or similar to the data described above as communicated between Data Access Node A 204, Data Access Node B 214, and the WTRUs in their respective managed areas 292, 294.

In the example architecture 200 of FIG. 2, channel quieting may be managed in a number of ways. For example, channel quieting may be managed in a decentralized fashion across the various access points and other WTRUs in the different networks 220, 230, 240, 250. Alternatively or additionally, channel quieting management functions may be managed in the database access nodes 204, 214, and/or be managed by the database access nodes 204, 214 in conjunction with the access points and other WTRUs in the different networks 220, 230, 240, 250. Channel quieting may be coordinated using the methods described below with reference to FIGS. 4-6, and/or using other techniques.

Communication between the central TVBD database server 202 and the database access nodes 204, 214 may take place via the Internet, and/or via one or more private networks. Communication between database access nodes 204, 214 and the enabling WTRUs 222, 242, 252 in their respective managed areas 292, 294 may also take place via the Internet, and/or via one or more private networks. Interfaces between the database access nodes 204, 214 and the enabling WTRUs 222, 242, 252 in their respective managed areas 292, 294 may be media-specific or media-dependent interfaces.

Although Managed Area A 292 and Managed Area B 294 are shown in FIG. 2 as not overlapping, in various implementations, managed areas may geographically overlap or may be geographically distinct. Further, although Network A 220, Network B 230, Network C 240, and Network D 250 are shown in FIG. 2 as not overlapping, in various implementations, any subset or sub-combinations of networks that are included in the example architecture 200 may geographically overlap or may be geographically distinct. Alternatively or additionally, any WTRU in any of the networks within the example architecture 200 may move between different networks within the example architecture 200. Although FIG. 2 shows two database access nodes 204, 214, two managed areas 292, 294, and four networks 220, 230, 240, 250, various implementations of the example architecture 200 may include any number of managed areas, networks, and WTRUs.

Figure 3:
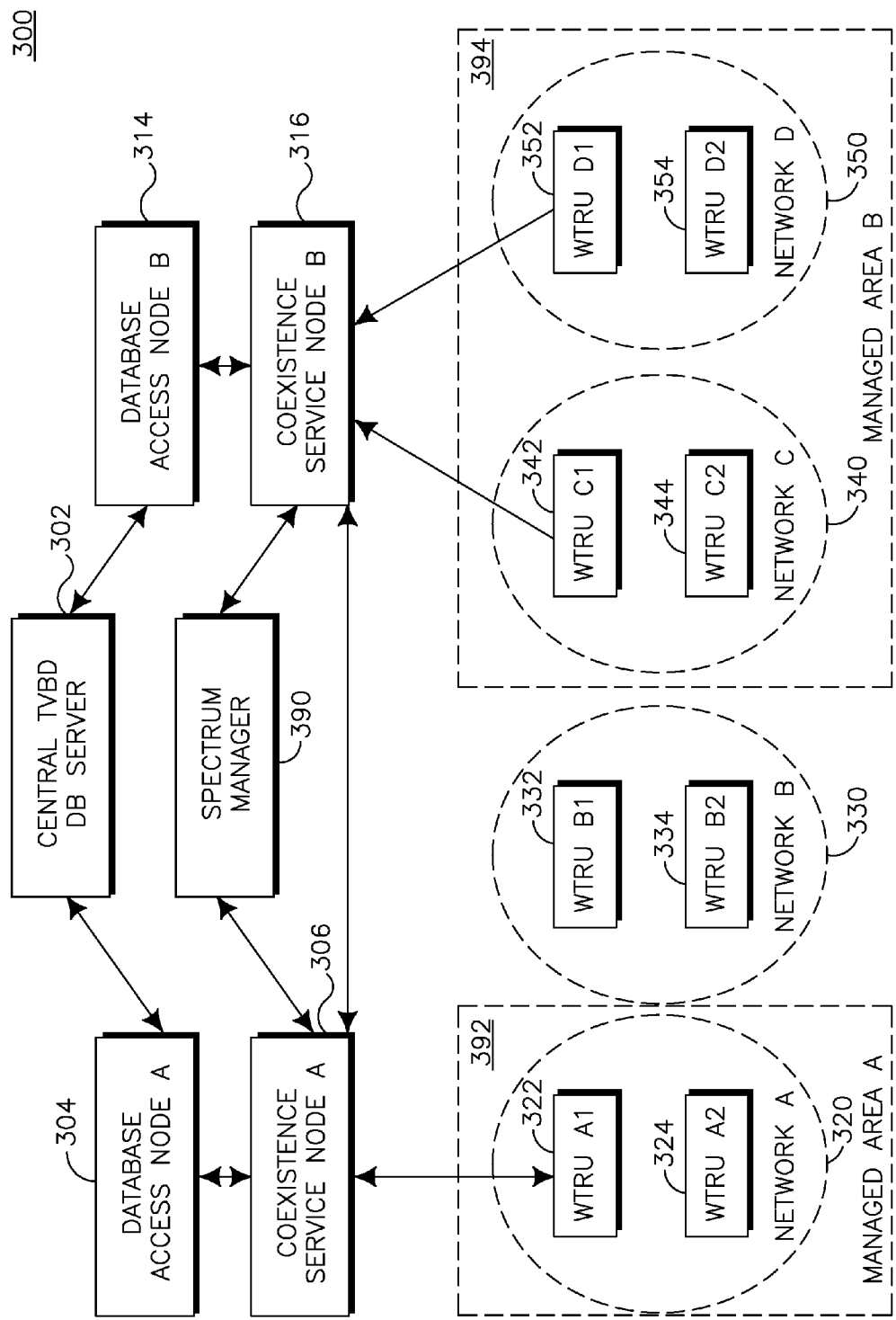
FIG. 3 shows a third example architecture for the communication of wireless data on TVBD frequencies.

FIG. 3 shows a third example architecture 300 for the communication of wireless data on TVBD frequencies. The example architecture 300 of FIG. 3 may include four radio access networks, Network A 320, Network B 330, Network C 340, and Network D 350. Each or any of these networks 320, 330, 340, 350 may be based on a technology such as IEEE 802.11x, IEEE 802.19.x, LTE, LTE-A, IEEE 802.16x, IEEE 802.22x, or any other wireless technology, and the networks 320, 330, 340, 350 may operate using any combination of different RATs.

The example architecture 300 of FIG. 3 includes central database server 302, which manages a central database of TVBD data. The TVBD data may include information related to licensed TVBD WTRUs and their licensed geographic areas, unlicensed TVBD WTRUs, and/or other information related to operation in TVBD frequencies.

The central TVBD database server 302 may be in communication with Database Access Node A 304 and Database Access Node B 314. Database Access Node A 304 and Database Access Node B 314 may store a full replica of the central TVBD database or some subset thereof. Database Access Node A 304 and/or Database Access Node B 314 may, for example, store only a portion of the central database that is applicable to a geographic area they are managing.

Database Access Node A may be in communication with Coexistence Service Node A 306. Together, Database Access Node A 304 and Coexistence Service Node A 306 may manage the operation of networks in Managed Area A 392 such as Network A 320. Database Access Node B 314 may be in communication with Coexistence Service Node B 316. Together, Database Access Node B 314 and Coexistence Service Node B 316 may manage Managed Area B 394, which includes Network C 340 and Network D 350.

Network A 320 may include any combination of Fixed, Mode I, Mode II, and/or SO TVBD WTRUs, such as WTRU A1 322 and WTRU A2 324. Network A 320 may be a radio access network based on a technology such as IEEE 802.11x, IEEE 802.19.x, LTE, LTE-A, IEEE 802.16x, IEEE 802.22x, or any other wireless technology. WTRU A1 322 and WTRU A2 324 may communicate using the RAT upon which Network A 320 is based. WTRU A2 324 may be, for example, a Mode I WTRU. WTRU A1 322 may be a base station or other type of WTRU, and may be a Fixed WTRU or a Mode II WTRU. WTRU A1 322 may operate as a master WTRU and receive enabling information from Database Access Node A 304. The received information may be enabling information, or may be information upon which enabling information may be based. WTRU A1 322 may provide enabling information to WTRU A2 324 and/or other non-master WTRUs (not depicted) in Network A 320 based on the received information. Network A 320 may also include other master WTRUs (not depicted).

WTRU A1 322 may communicate information to Database Access Node A 304 such as registration information and credentials for WTRU A1 322. In response, Database Access Node A 304 may determine whether WTRU A1 322 should be registered, and may send information to WTRU A1 322 indicating whether the registration was accepted or not. Further, WTRU A1 322 may communicate query information to Database Access Node A 304 to determine which TVBD channels it may operate on. The query information may include information related to a geolocation, terminal type, transmit power, and/or other information describing WTRU A1 322. Database Access Node A 304 may respond by sending one or more messages to WTRU A1 322 that indicate a list of TVBD channels that WTRU A1 322 is permitted to operate on. WTRU A1 322 may additional perform these types of communications with Database Access Node A 304 on behalf of non-master WTRUs in Network A120, such as WTRU A2 324 or other WTRUs. Communication between Database Access Node A 304 and WTRU A1 322 may be performed via Coexistence Service Node A 306.

Network C 340 may include any combination of Fixed, Mode I, Mode II, and/or SO TVBD WTRUs, such as WTRU C1 342 and WTRU C2 344. WTRU C1 342 and WTRU C2 344 may communicate using the RAT upon which Network C 340 is based. WTRU C2 344 may be, for example, a Mode I WTRU. WTRU C1 342 may be a base station or other type of WTRU, and may be a Fixed WTRU or a Mode II WTRU. WTRU C1 342 may operate as a master WTRU and receive information from Database Access Node B 314. The received information may be enabling information, or may be information upon which enabling information may be based. WTRU C1 342 may provide enabling information to WTRU C2 344 and/or other non-master WTRUs (not depicted) in Network C 340 based on the received information. Network C 340 may also include other master WTRUs (not depicted).

Communication between Database Access Node B 314 and WTRU C1 342 may be performed via Coexistence Service Node B 316.

Network D 350 may include any combination of Fixed, Mode I, Mode II, and/or SO TVBD WTRUs, such as WTRU D1 352 and WTRU D2 354. WTRU D1 352 and WTRU D2 354 may communicate using the RAT upon which Network D 350 is based. WTRU D2 354 may be, for example, a Mode I WTRU. WTRU D1 352 may be a base station or other type of WTRU, and may be a Fixed WTRU or a Mode II WTRU. WTRU D1 352 may operate as a master WTRU and receive information from Database Access Node B 314. The received information may be enabling information, or may be information upon which enabling information may be based. WTRU D1 352 may provide enabling information to WTRU D2 354 and/or other non-master WTRUs (not depicted) in Network D 350 based on the received information. Network D 350 may also include other master WTRUs (not depicted). Communication between Database Access Node B 314 and WTRU D1 352 may be performed via Coexistence Service Node B 316.

The example architecture 300 of FIG. 3 further includes Network B 330. Network B may include only SO TVBD WTRUs such as WTRU B1 332 and WTRU B2 334. Network B may be, for example, an ad hoc network, and may be based on a technology such as IEEE 802.11, 802.15, Zigbee, Bluetooth, or any other wireless technology. WTRU B1 332 and WTRU B2 334 may communicate using the RAT upon which Network B 330 is based. As shown in FIG. 3, none of the WTRUs in Network B 330 have a connection to a database access node; as the WTRUs in Network B 330 are SO WTRUs, such a connection is not required. The example architecture 300 may additionally include other ad hoc networks (not depicted) made up of SO WTRUs. The other ad hoc networks may operate using any of the RATs used by Network A 320, Network B 330, Network C 340, Network D 350, and/or any other appropriate RAT.

Coexistence Service Node A 306 and/or Coexistence Service Node B may maintain their own local databases of information related to WTRUs in their respective managed areas 392, 394. Further, Coexistence Service Node A 306 and Coexistence Service Node B 316 may communicate data to synchronize their respective databases, when they have overlap in networks and/or WTRUs that they are managing.

Database Access Node A 304 and/or Database Access Node B 314 may communicate with the WTRUs in Network B 330. This may be performed by using, for example, indirect signals such as beacon signals, channel jamming signals, microphone radio frequency (RF) aliases, and/r broadcast RF aliases. Database Access Node A 304 and/or Database Access Node B 314 may communicate data with the WTRUs in Network B 330 that is identical to and/or similar to the data described above as communicated between Data Access Node A 304, Data Access Node B 314, and the WTRUs in their respective managed areas 392, 394.

In addition or as an alternative to the communications described above, WTRUs in a managed area 392, 394 may send data to their respective Coexistence Service Nodes 306, 316 related to physical layer parameters, interference thresholds, service requirements, coexistence capabilities, and preferred coexistence parameters. Coexistence capabilities may include information related to what frequencies the WTRU can operate on, what types of measurements the WTRU can make, whether the WTRU can perform dynamic frequency selection, and whether the WTRU supports requests or commands from the Coexistence Service Nodes 306, 316 related to quiet periods. The Coexistence Service Nodes 306, 316 may transmit data to the WTRUs in their respective managed areas 392, 394 such as: information about other WTRUs operating in the managed area; available channel and coexistence mechanisms; and/or negotiated coexistence parameters. The information about other WTRUs may include, for example, information indicating channels that the other WTRUs are operating on and information about other RATs being used by the other WTRUs.

Coexistence Service Node A 306 and/or Coexistence Service Node B 316 may be in communication with Spectrum Manager 390. The Spectrum Manager 390 may perform functionality related to the assignment and/or re-assignment of channels across the networks 320, 340, 350 in Managed Area A 392 and Managed Area B 394. In various implementations, the functionality described above as attributed to the Spectrum Manager 190 of FIG. 1 may be performed by the Coexistence Service Nodes 306, 316, by the Spectrum Manager 390, or by a combination of the Coexistence Service Nodes 306, 316 and the Spectrum Manager 390.

Communication between the central TVBD database server 302, the database access nodes 304, 314, the Coexistence Service Nodes 306, 316, and/or the Spectrum Manager 390 may take place via the Internet, and/or via one or more private networks. Communication between the Coexistence Service Nodes 306, 316 and the enabling WTRUs 322, 342, 352 in their respective managed areas 392, 394 may also take place via the Internet, and/or via one or more private networks. Interfaces between the Coexistence Service Nodes 306, 316 and the enabling WTRUs 322, 342, 352 in their respective managed areas 392, 394 may be media-specific or media-dependent interfaces.

Although Managed Area A 392 and Managed Area B 394 are shown in FIG. 3 as not overlapping, in various implementations, the managed areas 392, 394 may geographically overlap or may be geographically distinct. Further, although Network A 392, Network B 330, Network C 340, and Network D 350 are shown in FIG. 3 as not overlapping, in various implementations, any subset or sub-combinations of networks that are included in the example architecture 300 may geographically overlap or may be geographically distinct. Alternatively or additionally, any WTRU in any of the networks within the example architecture 300 may move between different networks within the example architecture 300. Although FIG. 3 shows two database access nodes 304, 314, two managed areas 392, 394, and four networks 320, 330, 340, 350, various implementations of the example architecture 300 may include any number of managed areas, networks, and WTRUs.

Although FIG. 3 shows Database Access Node A 304 and Coexistence Service Node A 306 as distinct entities, in various implementations, these entities may be under the control of the same operator. Alternatively or additionally, the functionality described above as attributed to Coexistence Service Node A and Database Access Node A 304 may be implemented in a single device. The same applies, mutatis mutandis, to Database Access Node B 314 and Coexistence Service Node B 316.

Figure 4:
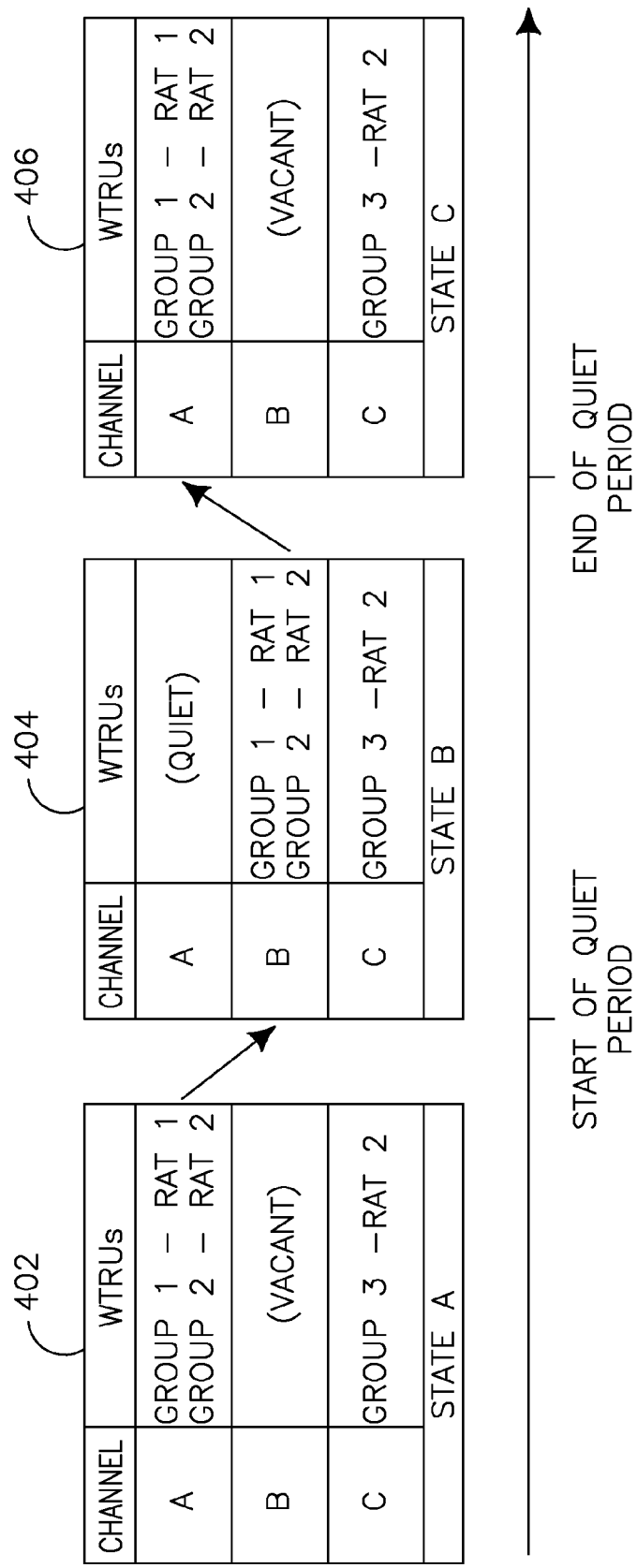
FIG. 4 shows an example method for the coordination of channel quieting across multiple RATs.

FIG. 4 shows an example method for the coordination of channel quieting across multiple RATs that includes temporary channel reassignment. The method of FIG. 4 begins at State A 402. At State A 402, three groups of one or more TVBD WTRUs (Group 1, Group 2, and Group 3) are operating in a managed area. The WTRUs in Group 1, Group 2, and Group 3 may be unlicensed TVBD WTRUs. The WTRUs in Group 1 may communicate wireless data on TVBD Channel A, using a first RAT (RAT 1). The WTRUs in Group 2 may also communicate wireless data on Channel A, using a second RAT (RAT 2). The WTRUs in Group 3 may communicate wireless data on Channel C, using RAT 2. The WTRUs in Group 2 and Group 3, though using the same RAT, may be in the same or in different access networks.

A spectrum management entity (not depicted) may receive data related to the WTRUs in Group 1, Group 2, and Group 3. The data may indicate, for example, the channels on which the WTRUs are communicating, the RATs used by the WTRUs, and/or other information. The spectrum management entity may make a determination that a quiet period should occur on Channel A. The spectrum management entity may send commands to the WTRUs in Group 1 and Group 2, indicating that they should move from Channel A to Channel B. Before the quiet period begins, the WTRUs in Group 1 and Group 2 move to Channel B. The WTRUs in Group 3 stay on Channel C.

At State B 404, the quiet period has begun. The WTRUs in Group 1 and Group 2 have moved to Channel B. During the quiet period, sensing may be performed on Channel A. During the quiet period, the WTRUs in Group 1 and Group 2 may communicate wireless data on Channel B. The spectrum management entity may send commands to the WTRUs in Group 1 and Group 2, indicating that they should move back from Channel B to Channel A. As the quiet period ends, the WTRUs in Group 1 and Group 2 move back to Channel A. The WTRUs in Group 3 stay on Channel C and may communicate wireless data on Channel C.

At State C 406, the quiet period has ended. The WTRUs in Group 1 and Group 2 have moved back to Channel A and may communicate wireless data on Channel A. Channel B is now vacant. The WTRUs in Group 3 stay on Channel C and may communicate wireless data on Channel C.

Figure 5:
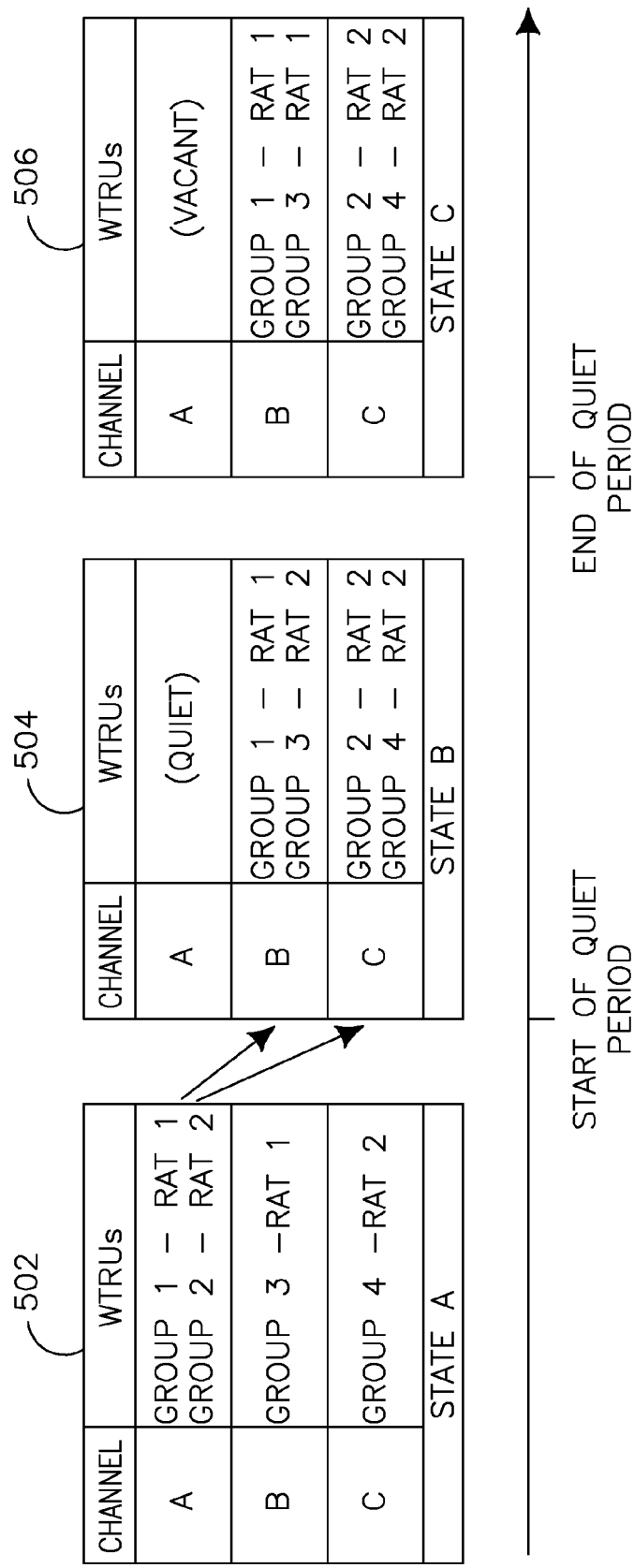
FIG. 5 shows a second example method for the coordination of channel quieting across multiple RATs.

FIG. 5 shows an example method for the coordination of channel quieting across multiple RATs that includes the aggregation of WTRUs using the same RAT onto the same channel. The method of FIG. 5 begins at State A 502. At State A 502, four groups of one or more TVBD WTRUs (Group 1, Group 2, Group 3, and Group 4) are operating in a managed area. The WTRUs in Group 1, Group 2, Group 3, and Group 4 may be unlicensed TVBD WTRUs. The WTRUs in Group 1 may communicate wireless data on TVBD Channel A, using a first RAT (RAT 1). The WTRUs in Group 2 may also communicate wireless data on Channel A, using a second RAT (RAT 2). The WTRUs in Group 3 may communicate wireless data on Channel B, using RAT 1. The WTRUs in Group 4 may communicate wireless data on Channel C, using RAT 2. The WTRUs in Group 1 and Group 3, though using the same RAT, may be in the same or in different access networks. The WTRUs in Group 2 and Group 4, though using the same RAT, may be in the same or in different access networks.

A spectrum management entity (not depicted) may receive data related to the WTRUs in Group 1, Group 2, Group 3, and Group 4. The data may indicate, for example, the channels on which the WTRUs are communicating, the RATs used by the WTRUs, and/or other information. The spectrum management entity may make a determination that a quiet period should occur on Channel A. The spectrum management entity further determines that WTRUs should be moved to different channels prior to the quiet period based on which RATs are currently being used on the channels that will be available during the quiet period. For example, the spectrum management entity determines that Group 1 should move from Channel A to Channel B, as Group 3 (which uses the same RAT as Group 1) is already operating on Channel B. The spectrum management entity determines that Group 2 should move from Chanel A to Channel C, as Group 4 (which uses the same RAT as Group 2) is already operating on Channel C. This determination may further be based on whether channel conditions on Channel B could support additional WTRUs operating on Channel B.

The spectrum management entity may send commands to the WTRUs in Group 1, indicating that they should move from Channel A to Channel B prior to the upcoming quiet period. The spectrum management entity may send commands to the WTRUs in Group 2, indicating that they should move to Channel C prior to the upcoming quiet period. The WTRUs in Group 1 and Group 2 may switch channels as indicated in the commands. The WTRUs in Group 3 may stay on Channel B and the WTRUs in Group 4 may stay on Channel C.

At State B 505, the quiet period has begun. The WTRUs in Group 1 have moved to Channel B. The WTRUs in Group 2 have moved to Channel C. During the quiet period, sensing may be performed on Channel A. During the quiet period, the WTRUs in Group 1 and Group 3 may communicate wireless data on Channel B, and the WTRUs in Group 2 and Group 4 may communicate wireless data on Channel C.

At State C 506, the quiet period has ended. The WTRUs in Group 1, Group 2, Group 3, and Group 4 may stay on the channels on which they operated at State B 504. Accordingly, the WTRUs in Group 1 and Group 3 may communicate wireless data on Channel B and the WTRUs in Group 2 and Group 4 may communicate wireless data on Channel C.

Figure 6:
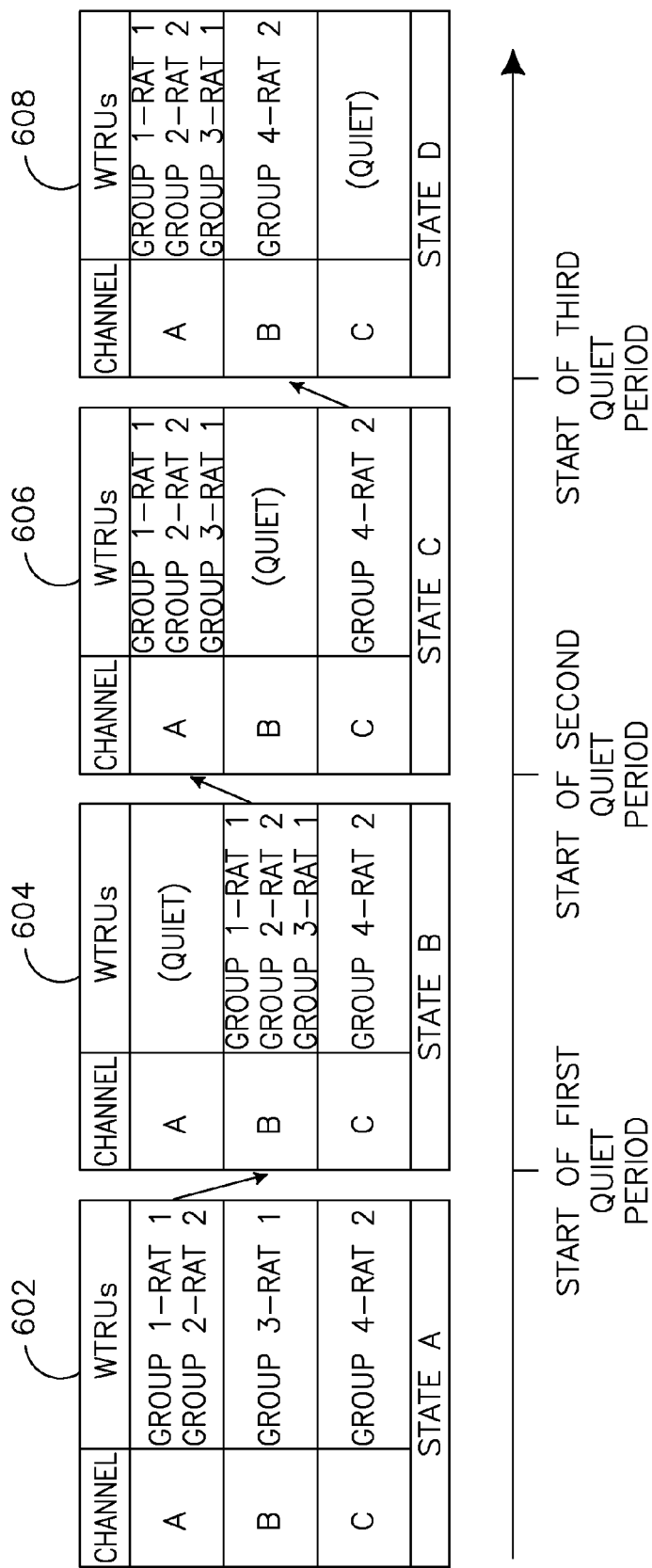
FIG. 6 shows a third example method for the coordination of channel quieting across multiple RATs.

FIG. 6 shows an example method for the coordination of channel quieting across multiple RATs that includes quiet periods on rotating channels. The method of FIG. 6 begins at State A 602. At State A 602, four groups of one or more TVBD WTRUs (Group 1, Group 2, Group 3, and Group 4) are operating in a managed area. The WTRUs in Group 1, Group 2, Group 3, and Group 4 may be unlicensed TVBD WTRUs. The WTRUs in Group 1 may communicate wireless data on TVBD Channel A, using a first RAT (RAT 1). The WTRUs in Group 2 may also communicate wireless data on Channel A, using a second RAT (RAT 2). The WTRUs in Group 3 may communicate wireless data on Channel B, using RAT 1. The WTRUs in Group 1 and Group 3, though using the same RAT, may be in the same or in different access networks. The WTRUs in Group 2 and Group 4, though using the same RAT, may be in the same or in different access networks.

A spectrum management entity (not depicted) may receive data related to the WTRUs in Group 1, Group 2, Group 3, and Group 4. The data may indicate, for example, the channels on which the WTRUs are communicating, the RATs used by the WTRUs, and/or other information. The spectrum management entity may determine that a first quiet period will occur, on Channel A. The spectrum management entity determines that some of the WTRUs operating on Channel A should be moved from Channel A to Channel B. The spectrum management entity may determine, for example, that some WTRUs operating on Channel A should be moved to Channel B in order to aggregate WTRUs operating using the same RAT onto Channel B. The spectrum management entity may send commands to the WTRUs in Group 1 and Group 2, indicating that they should move from Channel A to Channel B prior to the upcoming quiet period. The WTRUs in Group 1 and Group 2 may switch channels as indicated in the commands. The WTRUs in Group 3 may stay on Channel B and the WTRUs in Group 4 may stay on Channel C.

At State B 604, the first quiet period has begun. The WTRUs in Group 1 and Group 2 have moved to Channel B. During the first quiet period, sensing may be performed on Channel A. During the first quiet period, the WTRUs in Group 1, Group 2, and Group 3 may communicate wireless data on Channel B, and the WTRUs in Group 4 may communicate wireless data on Channel C.

At State B 604, the spectrum management entity may determine that a second quiet period will occur, on Channel B. The spectrum management entity may determine that the WTRUs operating on Channel B should be moved from Channel B to Channel A. The network management entity may then send commands to the WTRUs in Group 1, Group 2, and Group 3, indicating that they should move from Channel B to Channel A prior to the second quiet period. The WTRUs in Group 1, Group 2, and Group 3 may switch channels as indicated in the commands. The WTRUs in Group 4 stay on Channel C.

At State C 606, the second quiet period has started. The WTRUs in Group 1, Group 2, Group 3, have switched to Channel A, and may communicate wireless data on Channel A during the second quiet period. The WTRUs in Group 4 may communicate wireless data on Channel C.

At State C 604, the network management entity may determine that a third quiet period should occur, on Channel C. The network management entity may determine that the WTRUs operating on Channel C should move to Channel B. The network management entity may send commands to the WTRUs in Group 4, indicating that they should move from Channel C to Channel B prior to the third quiet period. The WTRUs in Group 4 may switch channels as indicated in the commands. The WTRUs in Group 1, Group 2, and Group 3 may stay on Channel A.

A State D, the third quiet period has started. The WTRUs in Group 4 have switched to Channel B, and may communicate wireless data on Channel B during the third quiet period. During the third quiet period, the WTRUs in Group 1, Group 2, and Group 3 may communicate wireless data on Channel A.

As described above with reference to FIGS. 4-6, a spectrum management entity may determine when quiet periods will occur. In various implementations, a spectrum management entity may determine a schedule for multiple future quiet periods, or may determine scheduling for one quiet period at a time. For example, at State A 602 of FIG. 6, the spectrum management entity may determine the start and end times for the first, second, and third quiet periods, and may determine the channels on which the first, second, and third quiet periods should be scheduled. Alternatively, a spectrum management entity may schedule a quiet period and then determine, during or after the scheduled quiet period, when the next quiet period and on which channel the next quiet period should occur. For example, at State A 602 of FIG. 6, a spectrum management entity may determine when the first quiet period should begin; then, at State B 604, the spectrum management entity may determine when the second quiet period should begin; and so on through State C 606 and beyond.

As described above with reference to FIGS. 4-6, a spectrum management entity may send one or more commands to WTRUs indicating that the WTRUs should switch channels. A channel switch command, such as the commands described above with reference to FIGS. 4-6, may include one or more fields that indicate a destination channel and/or operational parameters that describe the destination channel. A channel switch command may also indicate, for example, one or more quiet periods that have been scheduled on the channel and timing information that describes the start and end times for the scheduled quiet periods. Alternatively or additionally, a channel switch command may include a set of destination channels, from which the recipient WTRU may choose a destination channel. For each of the possible destination channels, the channel switch command may include identifying information, operational parameters that described the channel, and/or timing information that describes start and end times for quiet periods scheduled on the channel. Alternatively or additionally, a channel switch command may include a list of barred channels, a list of occupied channels that includes channel utilization information, information that indicates which RATs are being used on which channel, information that indicates a channel list for RATs that are similar to a given RAT, a target sensing measurement start time, a target sensing measurement end time, and/or information describing the periodicity of sensing measurements on one or more channels.

The methods described above with reference to FIGS. 4-6 may be implemented in the example architectures 100, 200, 300 described above with references to FIG. 1, FIG. 2, and/or FIG. 3, and/or in any other appropriate network architecture. FIGS. 4-6 describe a spectrum management entity. In various implementations, the functionality of the spectrum management entity described above with reference to any one of or any combination of FIGS. 4-6 may be implemented in a network node such as the Spectrum Manager 190 of FIG. 1, the database access nodes 204, 214 of FIG. 2, and/or across one or more of the Coexistence Service Nodes 306, 316 and the Spectrum Manager 390 of FIG. 3. Alternatively or additionally, the functionality of the spectrum management entity described above with reference to any one of or any combination of FIGS. 4-6 may be implemented across one or more base station or non-base station WTRUs, such as the enabling WTRUs 142, 152 described above with reference to FIG. 1, the enabling WTRUs 222, 242, 252 described above with reference to FIG. 2, and/or the enabling WTRUs 322, 342, 352 described above with reference to FIG. 3.

Figure 7:
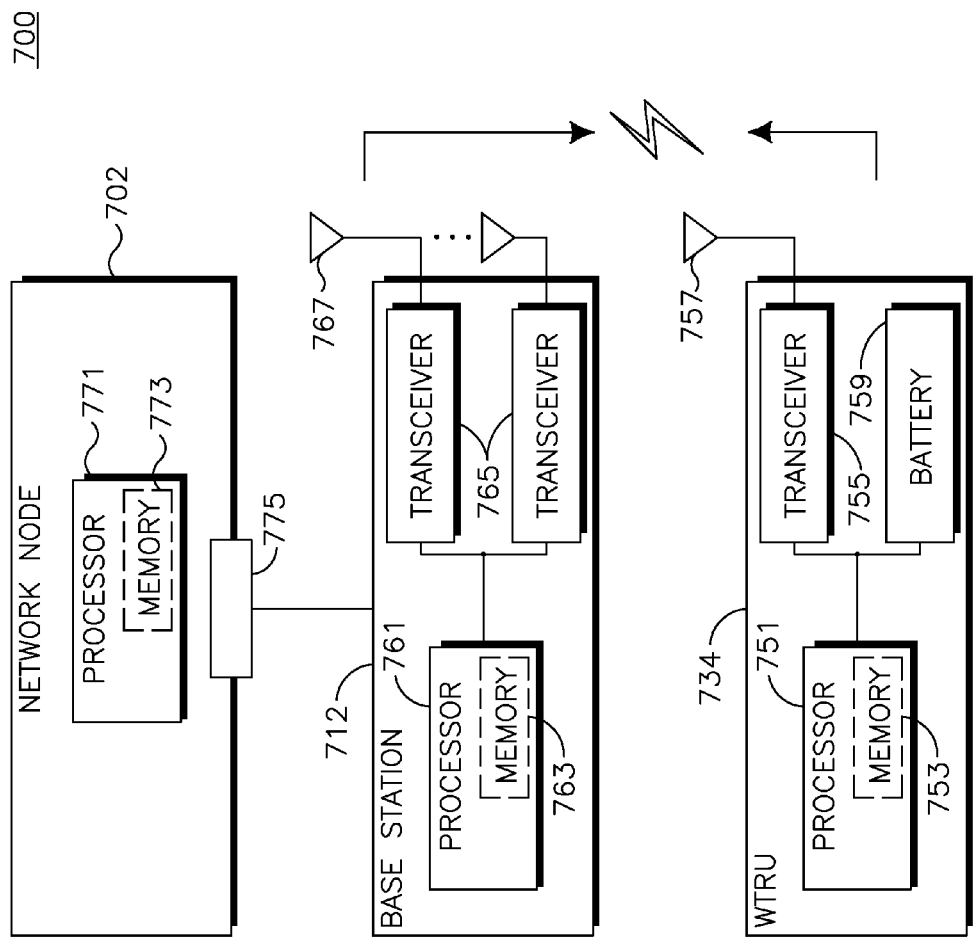
FIG. 7 shows an example wireless communication system that may be configured to perform methods and features described with reference to FIGS. 1-6.

FIG. 7 shows an example wireless communication system 700 that may be configured to implement the features and methods described above with reference to FIGS. 1-6. The wireless communication system may include a WTRU 734, a base station 712, and a network node 702.

In addition to the components that may be found in a typical WTRU, the WTRU 734 may include a processor 751 with a linked memory 761, a transceiver 781, a battery 759, and an antenna 757. The processor 751 may be configured to generate and/or process messages and other data as described above with reference to FIGS. 1-6. The transceiver 781 is in communication with the processor 751 and the antenna 757 to facilitate the transmission and reception of wireless data. In case a battery 759 is used in the WTRU 734, it may power the transceiver 755 and/or the processor 751. In addition to the transceiver 755 shown in FIG. 7, the WTRU 734 may include one or more additional transceivers (not depicted). The transceiver 755 may be capable of communicating wireless data on TVBD frequencies. The transceiver 755 may be a single-mode transceiver, or may be a multi-mode transceiver that is capable of communicating using two or more different RATs. The one or more additional transceivers (not depicted) may also each be single- or multi-mode transceivers. The one or more additional transceivers may be configured to, for example, perform sensing measurements on quieted channels. The WTRU 734 may be capable of performing functionality attributed to one or any combination of WTRUs described above with reference to FIGS. 1-6.

In addition to the components that may be found in a typical base station, the base station 712 may include a processor 761 with a linked memory 763, transceivers 765, and antennas 767. The processor 761 may be configured to generate and/or process messages and/or other data as described above with reference to FIGS. 1-6. The transceivers 765 are in communication with the processor 761 and antennas 767 to facilitate the transmission and reception of wireless data. The transceivers 765 may be capable of communicating wireless data on TVBD frequencies. Although the base station 712 of FIG. 7 is shown having two or more transceivers 765 and two or more antennas 767, a base station 712 may include any number of transceivers 765 and/or antennas 767, including one or more transceivers 765 and/or one or more antennas 767. The one or more transceivers 765 may be configured to, for example, to perform sensing measurements on quieted channels. The base station 712 may be capable of performing functionality attributed to any base station described above with reference to FIGS. 1-6.

The network node 702 may include a processor 771 and a linked memory 773. The network node 702 may be configured to implement functionality attributed to one or any combination of network nodes described above with reference to FIGS. 1-6, such as but not limited to the Spectrum Manager 190 of FIG. 1, the database access nodes 204, 214 of FIG. 2, the Coexistence Service Nodes 306, 316, the Spectrum Manager 390 of FIG. 3, the spectrum management entity of any one of or any combination of FIGS. 4-6, and/or a central TVBD database server 102, 202, 302 as described above with reference to FIGS. 1-3. The network node 702 may include a communications interface 775, which is configurable to transmit and/or receive data to/from the base station 712 and/or other network nodes (not depicted). The communications interface 775 may be or include a transceiver. The communications interface 775 may operate using wired and/or wireless communications technology. The communications interface 775 may be capable of communicating with the base station 712 and/or other network nodes based on technologies such as, for example, Internet Protocol (IP). The processor 771 may be configured to generate and/or process messages and other data as described above with reference to FIGS. 1-6.

Although examples are provided above with reference to FIGS. 1-7 in terms of specific radio access technologies, the principles described above are applicable to any or any combination of radio access technologies. The principles described above with reference to FIGS. 1-6 are applicable to wireless communications systems that are based on technologies such as LTE, LTE-A, Service Architecture Evolution (SAE), Universal Mobile Telecommunications System (UMTS), UMTS Terrestrial Radio Access Network (UT-RAN), IEEE 802.16/WiMax, Wireless Broadband (WiBro), Global System for Mobile Communications (GSM), Enhanced Data Rates for GSM Evolution (EDGE) Radio Access Network (GERAN), IEEE 802.11x/WLAN, Code Division Multiple Access 2000 (CDMA2000), IEEE 802.15, Zigbee, Bluetooth, IEEE 802.19.1, IEEE 802.22.x, and/or any other technology that supports the features and methods described above with reference to FIGS. 1-7.

Although examples are provided above with reference to FIGS. 1-7 in terms of Type I, Type II, Fixed, and SO TVBD WTRUs, the principles described above are applicable any type of TVBD WTRU, including TVBD WTRUs which are not configured to operate according to U.S. FCC guidelines. Further, although examples are provided above with reference to FIGS. 1-7 in terms of operation on TVBD frequencies, the principles described above are applicable to wireless communications in any frequency band.

Although features and elements are described above with reference to FIG. 1-7 in particular combinations, each feature or element can be used alone without the other features and elements or in various combinations with or without other features and elements. The sub-elements of the methods or flowcharts described above with reference to FIG. 1-7 may be realized in any order (including concurrently), in any combination or sub-combination. The methods or flow charts described above with reference to FIGS. 1-7 may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

As used herein, the term "processor" includes, but is not limited to, a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGA) circuits, any other type of integrated circuit (IC), a system-on-a-chip (SOC), and/or a state machine.

A processor in association with software may be used to implement a radio frequency transceiver for use in a wireless transmit receive unit (WTRU), user equipment (UE), terminal, base station, radio network controller (RNC), single-, dual-, or multi-band smartphone, or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for use in a network node, the method comprising:
    receiving device parameters from a wireless transmit/receive unit (WTRU) in a managed area operating on a first channel using a radio access technology (RAT);
    sending the device parameters to a television band (TVBD) database;
    receiving enabling information from the TVBD database;
    determining a start time for a quiet period based on a radio characteristic of a radio access network on which the WTRU is operating;
    determining, based on the received enabling information and based on the start time for the quiet period, operational parameters for the WTRU; and
    sending the operational parameters to the WTRU.

2. The method of claim 1, the network node determining that the WTRU should move to a second channel based on data indicating that a second WTRU using the RAT is operating on the second channel.

3. The method of claim 2, further comprising:
    receiving data indicating that a third WTRU is operating on the first channel using a second RAT;
    receiving data indicating that a fourth WTRU is operating on a third channel using the second RAT; and
    determining, based on the third WTRU and the fourth WTRU using the second RAT, that the third WTRU should move to the third channel prior to the quiet period; and sending second operational parameters to the third WTRU, the second operational parameters to the third WTRU, the second operational parameters indicating that the third WTRU should move to the third channel.

4. The method of claim 1, wherein the first channel and the second channel are television band (TVBD) channels.

5. The method of claim 1, wherein the operational parameters comprise at least one of an Institute of Electrical and Electronics Engineers (IEEE) Media Independent Coordination (MIC) message, an IEEE 802.19x message, an IEEE 802.11x message, an IEEE 802.16x message, or an 802.22x message.

6. The method of claim 1, wherein the radio characteristic comprises at least one of channel availability or channel loading.

7. The method of claim 1, the enabling information comprising information relating to a channel on which at least one other WTRU in the managed area is operating.

8. The method of claim 1, the operational parameters comprising information relating to a second channel to which the WTRU should move.

9. A network node comprising a processor to:
receive device parameters from a wireless transmit/receive unit (WTRU) operating on a first channel using a radio access technology (RAT);
send the device parameters to a television band (TVBD) database;
receive enabling information from the TVBD database;
determine a start time for a quiet period based on a radio characteristic of a radio access network on which the WTRU is operating;
determine, based on the received enabling information and based on the start time for the quiet period, operational parameters for the WTRU; and
send the operational parameters to the WTRU.

10. The network node of claim 9, the operational parameters comprising information relating to a second channel to which the WTRU should move.

11. The network node of claim 9, the enabling information comprising information relating to a channel on which at least one other WTRU is operating.

12. A method for use in a network node, the method comprising:
receiving first device parameters from a first wireless transmit/receive unit (WTRU) operating on a first channel using a first radio access technology (RAT);
receiving second device parameters from a second WTRU operating on the first channel using a second RAT;
sending the first device parameters and the second device parameters to a television band (TVBD) database;
receiving enabling information from the TVBD database;
determining, based on the enabling information, a start time for a quiet period on the first channel;
sending first operational parameters to the first WTRU via a first access network, the first access network being based on the first RAT, the first operational parameters indicating that the first WTRU should move to a second channel prior to the quiet period; and
sending second operational parameters to the second WTRU via a second access network, the second access network being based on the second RAT, the second operational parameters indicating that the second WTRU should move to the second channel prior to the quiet period.

13. The method of claim 12, the start time for the quiet period on the first channel being determined based on network status information received from at least one of the first WTRU or the second WTRU via at least one of the first access network or the second access network.

14. The method of claim 13, the network status information indicating one or more of: that the first WTRU has changed locations, that the first WTRU has changed channels, or that the first WTRU has detected a licensed WTRU on the first channel.

15. The method of claim 12, wherein the first channel and the second channel are TVBD channels.

16. The method of claim 12, wherein the first operational parameters or the second operational parameters comprise at least one of the following: an Institute of Electrical and Electronics Engineers (IEEE) Media Independent Coordination (MIC) message, an IEEE 802.19x message, an IEEE 802.11x message, an IEEE 802.16x message, or an 802.22x message.

17. The method of claim 12, the enabling information comprising information relating to a channel on which at least one other WTRU is operating.

18. The method of claim 12, the operational parameters comprising information relating to the second channel.

\* \* \* \* \*